United States Patent [19]
Nogawa et al.

[11] Patent Number: 5,470,513
[45] Date of Patent: Nov. 28, 1995

[54] CONTROLLING SCREW SPEED TO INJECTION COMPRESSION MOLDING MACHINE

[75] Inventors: Makoto Nogawa; Satoshi Fujimoto, both of Hiratsuka, Japan

[73] Assignee: Kabushiki Kaisha Komatsu Seisakusho, Tokyo, Japan

[21] Appl. No.: 142,458

[22] PCT Filed: May 31, 1991

[86] PCT No.: PCT/JP91/00738

§ 371 Date: Nov. 29, 1993

§ 102(e) Date: Nov. 29, 1993

[87] PCT Pub. No.: WO92/21504

PCT Pub. Date: Dec. 10, 1992

[51] Int. Cl.$^6$ .......................... B29C 45/70; B29C 45/77
[52] U.S. Cl. .................. 264/40.1; 264/328.7; 425/145; 425/562; 425/575
[58] Field of Search ........................... 425/135, 145, 425/147, 150, 166, 562, 575; 264/40.1, 40.5, 328.7

[56] References Cited

U.S. PATENT DOCUMENTS

| | | | |
|---|---|---|---|
| 4,846,651 | 7/1989 | Matsuda et al. | 425/145 |
| 5,035,599 | 7/1991 | Harashima et al. | 425/150 |
| 5,057,255 | 10/1991 | Sato et al. | 425/145 |
| 5,108,672 | 4/1992 | Sasaki et al. | 264/40.5 |
| 5,196,150 | 3/1993 | Mimura et al. | 264/40.5 |
| 5,221,509 | 6/1993 | Fujimoto et al. | 264/328.7 |

FOREIGN PATENT DOCUMENTS

| | | |
|---|---|---|
| 1-241417 | 9/1989 | Japan . |
| 1-234222 | 9/1989 | Japan . |
| 90-04508 | 5/1990 | WIPO . |

*Primary Examiner*—Jill L. Heitbrink
*Attorney, Agent, or Firm*—Richards, Medlock & Andrews

[57] ABSTRACT

An injection compression molding machine (1) has a clamping unit (10) for positioning an upper mold (15) with respect to a lower mold (16), and an injection unit (30). When the upper mold (15) moves to a specified, slightly open position, a screw (61) of the injection unit (30) is advanced to start the injection of molten resin. When the screw advances to a specified position, the screw speed is decelerated to a specified speed. In addition, when the screw advances to a predetermined stop position, the screw is stopped and the injection rate of molten resin is simultaneously reduced and the molten resin is kept pressurized until the gate (71) is closed.

12 Claims, 3 Drawing Sheets

CONTROLLING SCREW SPEED TO INJECTION COMPRESSION MOLDING MACHINE

TECHNICAL FIELD

The present invention relates to a device for and a method of molding for an injection molding machine, and more particularly to a device for and a method of molding for an injection molding machine by which fluctuation in weight of an injection-molded resin product is reduced.

BACKGROUND ART

The following methods have been implemented to manufacture molded resin products by a molding device for an injection molding machine, an injection compression molding machine, and an extrusion molding machine:

(1) A method by which resin is molded by moving a screw forwardly along a specified distance to inject resin and controlling a screw drive hydraulic pressure.

(2) A method by which a resin passage is closed and molds are pressurized by a press mechanism or the like, after moving a screw forwardly along a specified distance for injecting resin.

However, in the case of molding a product with a large projection area (that is, a large compression stroke), the molded products have had insufficient strength due to insufficient density or have had variable quality due to a number of flashes, because molded products vary substantially in weight despite the products being satisfactory in dimensional accuracy. In other words, there has been a problem including the following points:

(1) A hydraulic actuator is used to move the screw forwardly and its position is controlled in accordance with information fed back from a position sensor. However, it is difficult to accurately stop the screw at a specified position because of a time lag.

(2) It takes a certain amount of time to close a resin passage and, moreover, the amount of resin fed into a mold varies with the time necessary for closing the resin passage and any fluctuation of the screw position at which the resin passage begins to be closed, and therefore, it is difficult to maintain a stable weight of molded products.

An object of the present invention made in view of the above problem is to provide a device and a method of molding for an injection molding machine capable of reducing fluctuation in weight of resin molded products and of providing stable quality.

SUMMARY OF THE INVENTION

A molding device in accordance with the present invention for an injection molding machine, having a mold clamping unit which feeds molten resin into an opened mold and clamps the mold for compression molding, an injection unit which melts, kneads and injects molten resin into the opened mold using a screw, and a gate opening/closing mechanism which stops the injection of the molten resin, comprises a mold position detecting means for detecting a position of a specified mold when it is open, a stroke position detecting means for detecting the stroke position of the screw of the injection unit, a speed control means for controlling the advancing speed of the screw of the injection unit, a pressure control means for controlling an injection pressure, a gate opening/closing means for closing a gate after a specified amount of resin is fed through it into the mold, a gate opening detecting means for detecting the amount of gate opening, and a controller for generating commands to the speed control means, the gate opening/closing means, and the pressure control means.

The molding method of the present invention is adapted to: detect the position of the mold by a mold position detecting means when the movable mold has been lowered to a specified position, start the injection of molten resin by moving the screw forwardly in response to a signal from the mold position detecting means, detect by a stroke position detecting means when the screw has advanced to a specified position, decelerate the advancement of the screw to a specified speed in response to a signal from the stroke position detecting means, detect by the stroke position detecting means when the screw has advanced to a predetermined stop position, stop the advancement of the screw in response to a signal from the stroke position detecting means, reduce the injection rate of molten resin by gate opening/closing means, and pressurize molten resin by pressure control means until the gate is completely closed.

The advancement of the screw is decelerated to the specified speed at a position 1 to 7 mm in front of the predetermined stop position. After the deceleration is completed, the screw moves forwardly at a speed of 10 mm/sec or less.

According to the above described configuration of the present invention, the advancing speed of the screw is reduced and the molten resin feed rate is also reduced before the injection of a specified amount of molten resin into the mold is completed, and, therefore, the molten resin feed rate can be reduced before the gate closes, so that the feed rate control is facilitated, and the molten resin feed rate can be accurately controlled because the molten resin continues to be pressurized until the gate closes. These advantages result in smaller variations in weight of the molded products and in stable product quality. Molded products free from surface concavities and with satisfactory dimensional accuracy and structure can be obtained.

BEST MODE FOR CARRYING OUT THE INVENTION

By reference to the attached drawings, preferred embodiments of a device for and a method of molding for an injection molding machine of the present invention are described below in detail.

Figure 1:
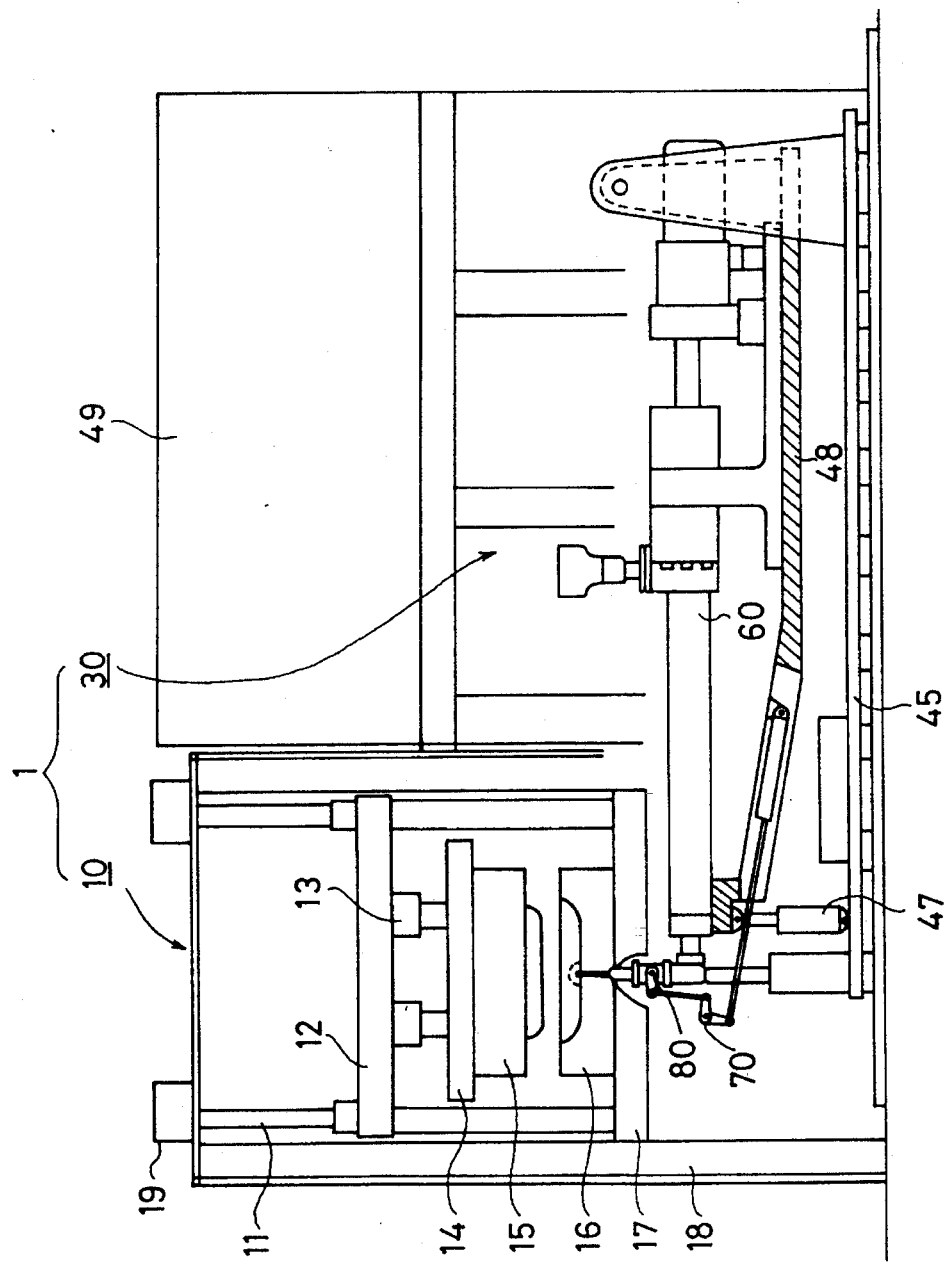
FIG. 1 shows a general view of an injection molding machine according to an embodiment of the present invention.
Figure 2:
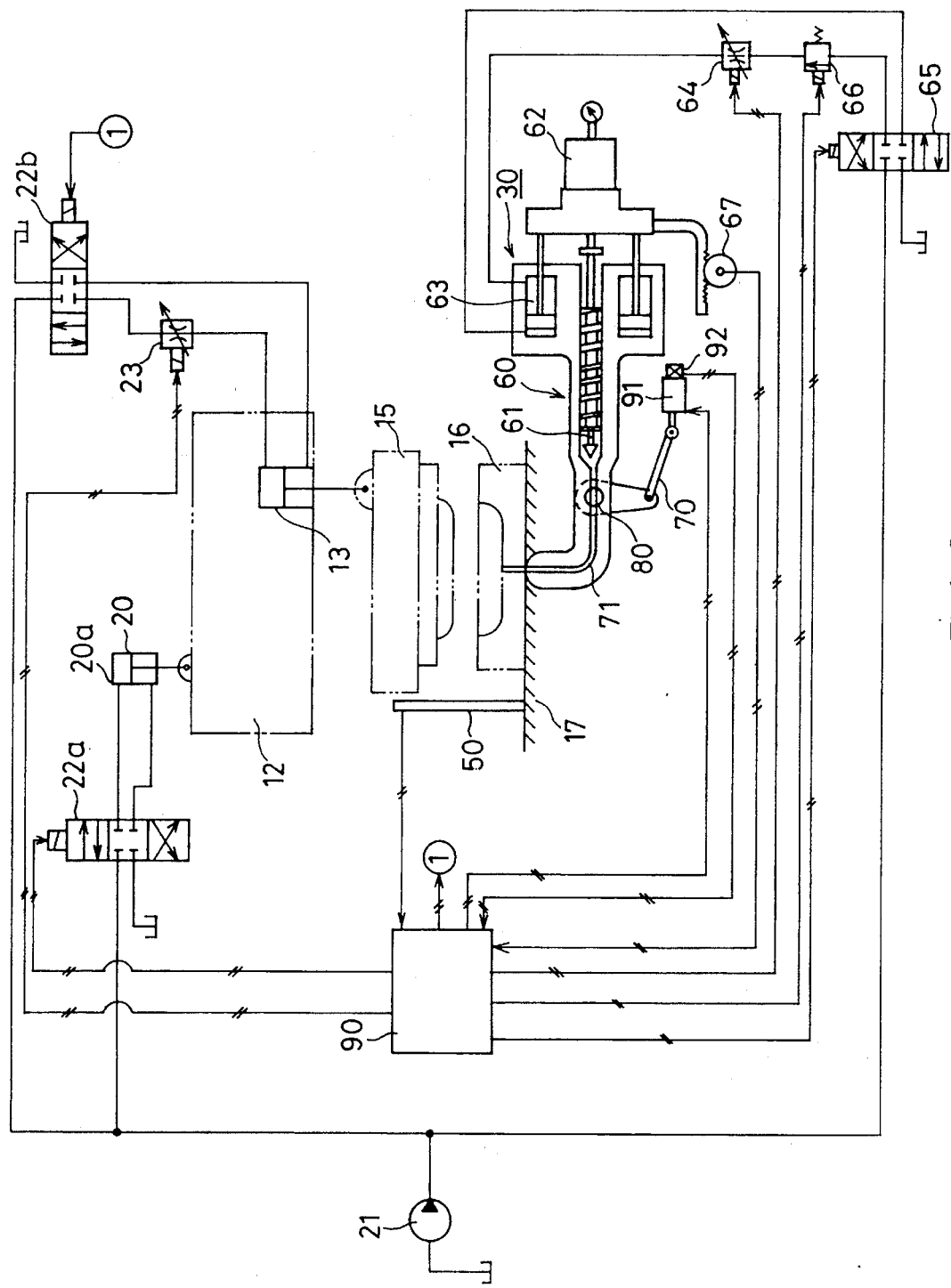
FIG. 2 is an electrical circuit diagram including a hydraulic circuit diagram of the embodiment shown in FIG. 1.

In FIG. 1, a molding device (hereafter referred to as "molding device 1") for an injection molding machine having a clamping unit 10 such as a press, which opens or closes the mold in a vertical direction and an injection unit 30 which is located below the die plate of the clamping unit 10 and feeds resin into the opened mold, comprises a base 45 which horizontally slides below the clamping unit 10, a tractor unit, not shown, which actuates the base 45 to slide horizontally, a rocking block 48 which is supported by the base 45 at its one end and is rocked by an actuator 47 at its other end, an injection unit 30 which is fixed to the rocking block 48, and a hydraulic unit 49. The clamping unit 10 comprises four lift guide rods 11, a lift frame 12 which is supported by the lift guide rods 11 and moves in a vertical direction, an upper die plate 14 supported by four compression cylinders 13 incorporated in the lift frame 12, an upper mold 15 attached to the upper die plate 14, a lower mold 16 provided faced to the upper mold 15, a lower die plate 17 which holds the lower mold 16 and supports the lift guide rods 11, and a frame 18 which fixes the lower die plate 17, and vertically opens and closes the mold by the actuator 20 (FIG. 2). A mold position sensor 50, which detects the positions of the lower mold 16 and upper mold 15, is fixed to the lower die plate 17. The injection unit 30 comprises an injection mechanism 60, a gate opening/closing mechanism 70, a resin passage varying mechanism 80, and a controller 90.

As shown in FIG. 2, the actuator 20 and compression cylinders 13 are actuated by a hydraulic pressure supplied from the pump 21 through solenoid valves 22a and 22b. A flow control valve 23 is installed in the hydraulic circuit for the compression cylinders 13 to control the flow rate of hydraulic oil to the compression cylinders 13 in accordance with a command signal from the controller 90 which is responsive to a detection signal generated by the mold position sensor 50, to move up and down the upper mold 15 which is kept in parallel with the lower mold 16. This mold parallel drive mechanism comprises a mold position sensor 50, a flow control valve 23, a controller 90, and compression cylinders 13. The flow rate of oil in the hydraulic circuit for compression cylinders 13 can be controlled by a variable pump instead of the flow control valve 23.

Figure 3:
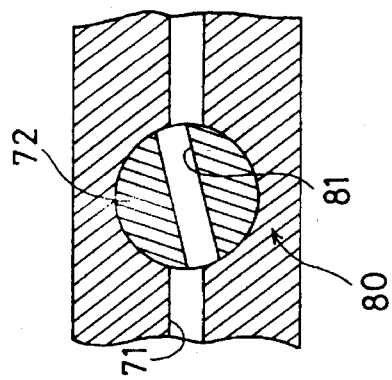
FIG. 3 is an enlarged cross-sectional view of the resin passage varying mechanism.

The injection mechanism 60 comprises a screw 61, a screw drive motor 62, injection cylinders 63, a flow control valve 64, a solenoid valve 65, and a pressure regulating valve 66. The screw drive motor 62 rotates the screw 61 to knead and meter molten resin and the flow control valve 64 adjusts the hydraulic oil flow rate to the injection cylinders 63 to control the longitudinal sliding movement of the pistons in the injection cylinders 63 to thereby control the injection rate of molten resin into the mold. The quantity of resin to be injected is measured by detecting the position of the pistons in the injection cylinders 63 with the injection cylinder pistons position sensor 67. The gate opening/closing mechanism 70 and the resin passage varying mechanism 80 are installed on the injection nozzle 71 located between the lower mold 16 and the injection mechanism 60. The servo motor 91 is driven with a command signal from the controller 90 to open or close the valve 72 (FIG. 3) of the resin passage varying mechanism 80 through the gate opening/closing mechanism 70. The valve position sensor 92 detects the position of the valve 72. The gate opening area is determined by varying the relative position of the passage 81 provided inside the valve 72 and the injection nozzle 71.

Figure 4:
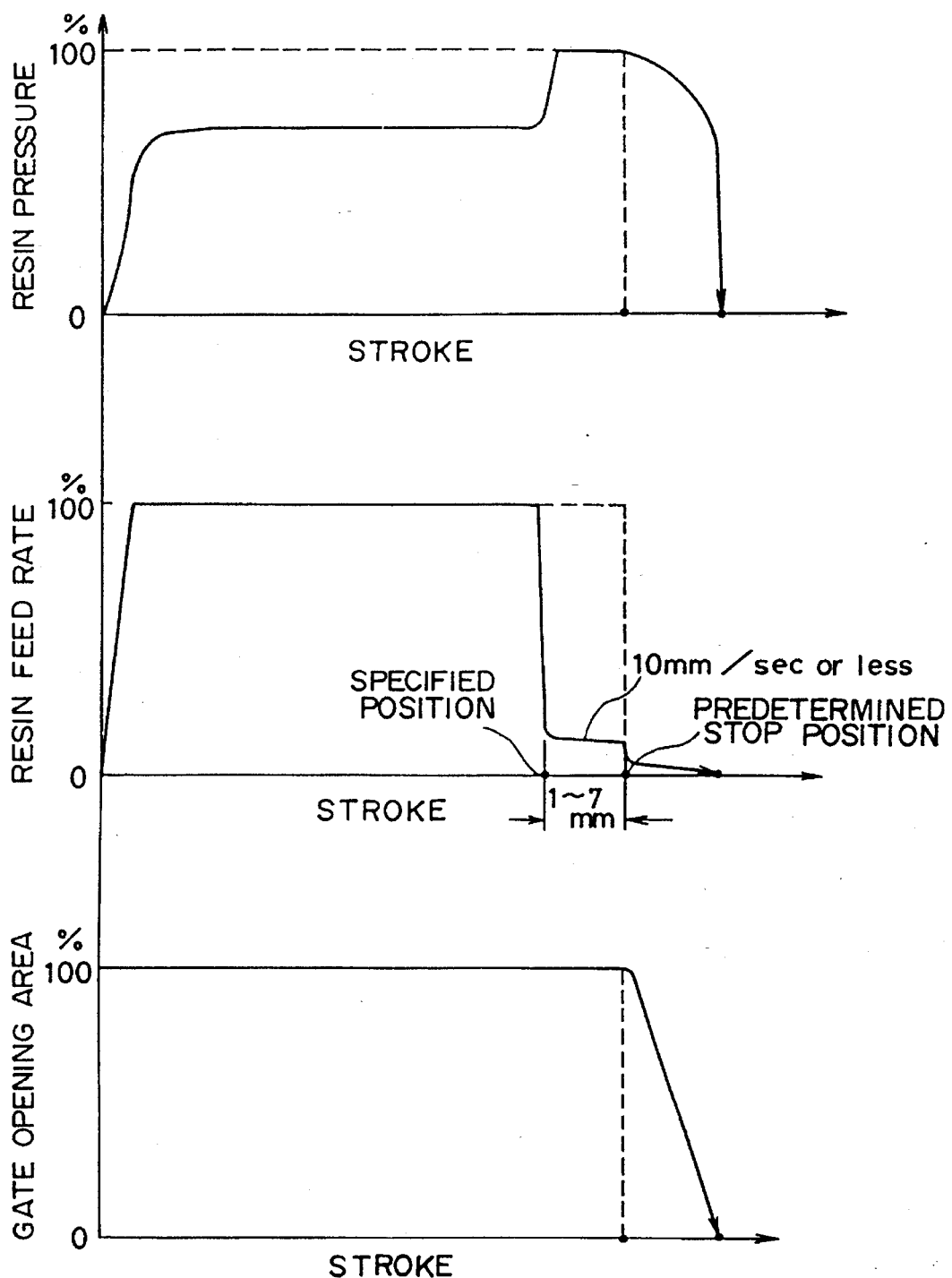
FIGS. 4 graphs respectively showing the relationship of the resin pressure, resin feed rate, and gate opening area to the stroke of the screw.

A molding method by means of a molding device for the injection molding machine of the present invention is described below, referring to FIG. 1 and the graphs shown in FIGS. 4. When the lift frame 12 is lowered to the lowest point (i.e., the stroke of the actuator 20 is maximized) and the compression cylinders 13 are actuated to make the upper mold 15 and the lower mold 16 come in contact with each other while the stroke is maximized, the heights of four lift guide rods 11 are individually adjusted by height adjusters 19 to ensure close contact of upper and lower molds 15 and 16. With the two molds kept in close contact, hydraulic pressure is transmitted to the port 20a of the actuator 20 to eliminate backlash, and the adjustment is thus completed.

The upper mold 15 is first lifted from the position at which it is in contact with the lower mold 16, and is then lowered to a specified position (where the upper mold 15 and the lower mold 16 are slightly separated). When the mold position sensor 50 detects that the upper mold 15 has reached the specified position, it transmits a detection signal to the controller 90 to stop the movement of the upper mold 15. Simultaneously, the solenoid valve 65 is actuated with a command signal from the controller 90 to supply hydraulic oil from the pump 21 to the injection cylinders 63 to advance the screw 61 at the specified speed. When the stroke position sensor 67 detects that the screw 61 has reached the specified position, the controller 90, which has received this detection signal, transmits a command signal to the flow control valve 64 to reduce the advancing speed of the screw 61. As shown in the middle graph in FIG. 4, the deceleration of the advancing of the screw 61 can be started at a position 1 to 7 mm in front of the predetermined stop position. A preferable advancing speed of the screw after deceleration can be 10 mm/sec or less. When the screw 61 has moved forwardly at a speed of 10 mm/sec or less until it reaches the predetermined stop position, the stroke position sensor 67 detects the position of the screw 61 and transmits a detection signal to the controller 90 to change over the solenoid valve 65 and stop the advancement of the screw 61. At the same time, the servo motor 91 is driven with a command signal from the controller 90 to start the closing of the valve 72 of the gate opening/closing mechanism 70 as shown in the lowermost graph in FIG. 4. As the valve 72 is being closed, the screw 61 is continuously moved forwardly and the molten resin remains pressurized. At the same time, the valve position sensor 92 detects the start of the closing of the valve 72 and the controller 90, which has received this signal, transmits a command signal to the pressure regulating valve 66 to start the reduction of the injection pressure of the molten resin as shown in the uppermost graph in FIG. 4. After the resin pressure is appropriately reduced, the compression cylinders 13 are actuated to apply a pressure to the upper mold 15 to press molten resin into the full range of the mold, thus reducing variations in the density of resin. Molding is completed.

The test conditions and test results in the above embodiment are shown below.
(1) Test conditions
  Material: PMMA (polymethyl methacrylate)
  Initial advancing Screw speed: 85 mm/sec
  Advancing screw speed after deceleration: 3.5 mm/sec
  Number of sample moldings tested: 50 pieces (by continuous molding)
(2) Test results
  The table below shows the comparison data with respect to the quality of moldings according to the method of the present invention and the conventional method.

TABLE 1

| Molding quality | Molding method | |
|---|---|---|
|  | Method of the present invention | Conventional method |
| X | 28.29 g | 28.14 g |
| $\sigma_{n-1}$ | 0.0292 | 0.0662 |

TABLE 1-continued

| | Molding method | |
|---|---|---|
| Molding quality | Method of the present invention | Conventional method |
| $\sigma_{n-1}/X$ | 0.10% | 0.24% |
| R | 0.099 g | 0.226 g |
| R/X | 0.35% | 0.80% |

As shown by Table 1, the deviation $\sigma_{n-1}$ and inter-group fluctuation R of data obtained by the method according to the present invention are less than half those according to the conventional method, showing remarkable reduction of the variations.

Industrial Applicability

The present invention is useful as a molding device and a molding method for the injection molding machine to enable reduction of variations in the weight of resin moldings and to obtain stable qualities.

What is claimed is:

1. In a method for molding in an injection compression molding machine, comprising:

positioning first and second molds in a slightly opened condition with a space between said first and second molds, feeding molten resin into said space between said first mold and said second mold in said slightly opened condition by stroking a screw of an injection unit to inject molten resin through a gate into said space, compressing the thus fed molten resin between said first and second molds, and cooling the thus compressed resin; the improvement comprising the combination of the steps of:

detecting when said first mold is moved to a specified open position;

starting injection of molten resin into said space by stroking said screw at an advancing speed to advance said screw when said mold is detected at said specified open position;

detecting when said screw has advanced to a specified position in front of a predetermined stop position;

reducing the advancing speed of said screw to a lower specified value when the advance of said screw is detected at said specified position, in order to thereby reduce the feed rate of molten resin into said space before the injection of a specified amount of molten resin into said space is completed, and to feed molten resin at the thus reduced rate during the time between the screw reaching said specified position and the screw reaching said predetermined stop position;

detecting when said screw has advanced further from said specified position to said predetermined stop position;

starting the stopping of the advance of said screw when the advance of said screw is detected at said predetermined stop position;

starting the closing of said gate when the advance of said screw reaches said predetermined stop position; and pressurizing said molten resin until the closing of said gate is completed.

2. A method in accordance with claim 1, wherein the distance between said specified position and said predetermined stop position is in the range of 1 to 7 mm.

3. A method in accordance with claim 1, wherein the advancing speed of said screw at said reduced rate is 10 mm/sec or less.

4. A method in accordance with claim 1, wherein said gate is closed after a specified amount of molten resin has been fed through said gate.

5. A method in accordance with claim 1, further comprising starting the reduction of the pressure of said molten resin when the closing of said gate is started.

6. In an injection compression molding machine having:

a mold clamping unit which positions first and second molds in a slightly opened condition with a space between said first and second molds and clamps said first and second molds for compression molding;

an injection unit having a gate, a screw which is stroked forwardly to inject molten resin through said gate into the space between said first and second molds in said slightly opened condition, and a gate opening/closing mechanism which closes said gate to stop the injection of molten resin into the space between said first and second molds;

a mold position detector for detecting a position of said first mold;

a stroke position detector for detecting a stroke position of said screw;

a speed controller for controlling a speed at which said screw is stroked forwardly;

a pressure controller for controlling an injection pressure of molten resin;

a gate position detector for detecting an opening position of said gate; and a controller for transmitting command signals to said speed controller, said gate opening/closing mechanism, and said pressure controller in response to signals from the detectors;

the improvement:

wherein said stroke position detector comprises means for providing a first signal to said controller when said stroke position of said screw has advanced to a specified position in front of a predetermined stop position and for providing a second signal to said controller when said stroke position of said screw has advanced further to said predetermined stop position, and wherein said controller comprises means for transmitting a command signal to said speed controller to reduce the advancing stroke speed of said screw to a specified reduced value, when said stroke position detector provides said first signal, in order to thereby reduce the feed rate of molten resin into the space between said first and second molds before the injection of a specified amount of molten resin into the space between said first and second molds is completed, and to feed molten resin at the thus reduced rate during the time between the first and second signals, for transmitting a command signal to said speed controller to start the stopping of the advancing stroke of said screw when said stroke position detector provides said second signal, for transmitting a command signal to said gate opening/ closing mechanism to begin closing said gate when said stroke position detector provides said second signal, and for transmitting a command signal to said pressure controller for said pressure controller to pressurize said molten resin until the closing of said gate is completed.

7. An injection compression molding machine in accordance with claim 6, wherein said controller further comprises means for transmitting a command signal to said gate opening/closing mechanism for closing said gate when a specified amount of resin is fed through said gate.

8. An injection compressing molding machine in accordance with claim 7, wherein said controller further comprises means for transmitting a command signal to said pressure controller for said pressure controller to start reducing the pressure of said molten resin when said gate position detector detects the start of closing of said gate.

9. An injection compression molding machine in accordance with claim 8, wherein said specified position is selected so that the feed rate of molten resin is reduced before said controller transmits a command signal to said gate opening/closing mechanism to begin closing said gate.

10. An injection compression molding machine in accordance with claim 9, wherein the distance between said specified position and said predetermined stop position is in the range of 1 to 7 mm.

11. An injection compression molding machine in accordance with claim 6, wherein said controller further comprises means for transmitting a command signal to said pressure controller for said pressure controller to start reducing the pressure of said molten resin when said gate position detector detects the start of closing of said gate.

12. An injection compression molding machine in accordance with claim 6, wherein the distance between said specified position and said predetermined stop position is in the range of 1 to 7 mm.

\* \* \* \* \*